United States Patent
Van Der Steur et al.

(10) Patent No.: US 11,420,744 B2
(45) Date of Patent: Aug. 23, 2022

(54) AUTOMATED DRONE-BASED PAINT DELIVERY SYSTEM

(71) Applicant: EFC Systems, Inc., Havre de Grace, MD (US)

(72) Inventors: Gunnar Van Der Steur, Chesapeake City, MD (US); Joseph Cichocki, Newark, DE (US)

(73) Assignee: EFC SYSTEMS, INC., Havre De Grace, MD (US)

( * ) Notice: Subject to any disclaimer, the term of this patent is extended or adjusted under 35 U.S.C. 154(b) by 0 days.

(21) Appl. No.: 17/172,605

(22) Filed: Feb. 10, 2021

(65) Prior Publication Data

US 2022/0169387 A1 Jun. 2, 2022

Related U.S. Application Data

(60) Provisional application No. 63/119,115, filed on Nov. 30, 2020.

(51) Int. Cl.
| | | |
|---|---|---|
| *B64D 1/18* | (2006.01) | |
| *B05B 3/10* | (2006.01) | |
| *B64C 39/02* | (2006.01) | |

(52) U.S. Cl.
CPC ............. *B64D 1/18* (2013.01); *B05B 3/1035* (2013.01); *B64C 39/024* (2013.01); *B64C 2201/12* (2013.01)

(58) Field of Classification Search
CPC . B64D 1/18; B64C 2201/12; B64C 2201/027; B64C 2201/148
See application file for complete search history.

(56) References Cited

U.S. PATENT DOCUMENTS

| | | |
|---|---|---|
| 7,056,387 B2 | 6/2006 | van der Steur |
| 8,807,074 B2 * | 8/2014 | Baumann .............. F16L 11/121 118/323 |
| 8,851,397 B1 | 10/2014 | van der Steur et al. |
| 8,973,848 B2 | 3/2015 | van der Steur et al. |

(Continued)

FOREIGN PATENT DOCUMENTS

WO 2020200368 A1 10/2020

OTHER PUBLICATIONS

Coxworth, "Swarm of drones spray-paints crowdsourced graffiti mural", New Atlas, 9 pages, Jul. 2019, <https://newatlas.com/ufo-drones-graffiti-painting/60423/>.

(Continued)

*Primary Examiner* — Philip J Bonzell
(74) *Attorney, Agent, or Firm* — Panitch Schwarze Belisario & Nadel LLP (57) ABSTRACT

An automated drone-based surface treatment material delivery system includes a drone having a body, at least one propeller rotatably supported by the body, at least one propeller motor supported by the body and configured to selectively apply motive power to the at least one propeller, and a controller supported by the body and configured to control a flight path of the drone at least by manipulating a speed of the at least one propeller. The drone also has a rotary atomizer supported by the body for movement therewith. The rotary atomizer includes a rotating dispersion structure configured to disperse a surface treatment material from a material supply.

13 Claims, 4 Drawing Sheets

(56) References Cited

U.S. PATENT DOCUMENTS

| | | | |
|---|---|---|---|
| 9,375,734 B1 | 6/2016 | van der Steur et al. | |
| 9,611,038 B2* | 4/2017 | Dahlstrom | B05B 13/005 |
| 9,776,200 B2* | 10/2017 | Busby | B05B 12/122 |
| 9,815,078 B2* | 11/2017 | Neustadt | B05C 1/06 |
| 9,862,489 B1* | 1/2018 | Weinstein | B64F 1/0297 |
| 9,970,481 B1 | 5/2018 | van der Steur et al. | |
| 10,011,352 B1* | 7/2018 | Dahlstrom | B64C 39/024 |
| 10,023,311 B2* | 7/2018 | Lai | B64D 47/08 |
| 10,195,629 B1* | 2/2019 | Dahlstrom | B64C 39/022 |
| 10,304,455 B1 | 5/2019 | Ulaganathan et al. | |
| 10,399,676 B2* | 9/2019 | Dahlstrom | B05B 9/0403 |
| 10,413,921 B1 | 9/2019 | van der Steur et al. | |
| 10,577,100 B2* | 3/2020 | Beardsley | B64C 39/024 |
| 10,821,463 B2* | 11/2020 | Busby | B05B 12/122 |
| 2007/0034715 A1* | 2/2007 | Clifford | B05B 3/1092 239/291 |
| 2012/0234233 A1* | 9/2012 | Baumann | B05B 9/03 118/300 |
| 2015/0274294 A1* | 10/2015 | Dahlstrom | B05B 13/0278 239/722 |
| 2015/0344136 A1* | 12/2015 | Dahlstrom | B64C 39/024 701/3 |
| 2016/0031275 A1* | 2/2016 | Monroe | B64C 39/024 244/2 |
| 2016/0082460 A1* | 3/2016 | McMaster | B05B 12/122 701/2 |
| 2017/0209885 A1* | 7/2017 | Neustadt | B05C 1/06 |
| 2017/0259920 A1* | 9/2017 | Lai | B64D 47/08 |
| 2018/0043386 A1* | 2/2018 | Busby | B05B 9/007 |
| 2019/0127064 A1* | 5/2019 | Beardsley | B05B 15/652 |
| 2019/0247877 A1* | 8/2019 | Fideler | B05B 13/005 |
| 2019/0276140 A1* | 9/2019 | Poltorak | B64C 27/08 |
| 2019/0366375 A1 | 12/2019 | Thompson et al. | |
| 2020/0002000 A1* | 1/2020 | Dahlstrom | B05B 13/0278 |
| 2020/0039645 A1* | 2/2020 | Soryal | B64C 39/024 |
| 2020/0070976 A1 | 3/2020 | Beckhoff | |
| 2020/0222929 A1* | 7/2020 | Beardsley | B05B 12/122 |
| 2020/0333779 A1* | 10/2020 | Regev | B64C 29/0025 |
| 2021/0078028 A1* | 3/2021 | Woll | B05B 12/084 |

OTHER PUBLICATIONS

"PaintCopter: An Autonomous UAV for Spray Painting on 3D Surfaces," (Oct. 2, 2018), <https://www.youtube.com/watch?v=YTvr3jCsf0o>.

Paul Szoldra, "This drone can paint your house better than you can," (Mar. 18, 2016), <https://www.businessinsider.com/apellix-drone-can-paint-homes-and-de-ice-airplanes-2016-3>.

Charles Choi, "Air Brushed: New Drones Make Painting Easier," (Jan. 5, 2017), <-hllps://insideunmannedsystems.com/air-brushed-new-drones-make-painting-easier/>.

"ACCUBELL ® 709 EVO Robotic Rotary Atomizer," (Jan. 10, 2017), <https://www.youtube.com/watch?v=JpvL91-J8Gs&t=5s>.

Int'l Search Report and Written Opinion dated Mar. 26, 2021 in Int'l Application No. PCT/US2021/024301.

\* cited by examiner

AUTOMATED DRONE-BASED PAINT DELIVERY SYSTEM

CROSS-REFERENCE TO RELATED APPLICATIONS

This application claims the benefit of U.S. Provisional Patent Application No. 63/119,115, filed on Nov. 30, 2020, entitled "Automated Drone-Based Paint Delivery System Featuring a Rotary Atomizer," the entire contents of which are incorporated by reference herein.

BACKGROUND

Embodiments described herein relate generally to a drone-based surface treatment material delivery system, and more particularly, to an automated drone-based paint delivery system configured for use in assembly line painting operations of motor vehicle body parts.

When a product requires painting on an assembly line, such as an automobile assembly line, large robots are conventionally used to perform the task. These robots are expensive to build and maintain. In addition, the robots may be permanent fixtures on the assembly line such that when a problem occurs, the line may have to be completely shut down to fix the robot, resulting in decreased productivity. While general painting using a drone or unmanned aerial vehicle (LAY) has been recently introduced, the proposed arrangements are not suitable for industrial use, such as with the aforementioned assembly lines. In particular, the drones presently in use for painting utilize a common spray nozzle or are retrofitted with a hand-held spray gun. These systems have a poor transfer efficiency and result in an unsatisfactory final appearance.

It is therefore desired to provide a robust drone-based paint delivery system that can be automated and is suitable for use on a product assembly line.

BRIEF SUMMARY

Briefly stated, one embodiment comprises an automated drone-based surface treatment material delivery system that includes a drone having a body, at least one propeller rotatably supported by the body, at least one propeller motor supported by the body and configured to selectively apply motive power to the at least one propeller, and a controller supported by the body and configured to control a flight path of the drone at least by manipulating a speed of the at least one propeller. The drone also has a rotary atomizer supported by the body for movement therewith. The rotary atomizer includes a rotating dispersion structure configured to disperse a surface treatment material from a material supply.

In one aspect, the system further includes a camera disposed on or in the body and operatively connected to the controller. In another aspect, the controller is configured to receive and analyze image or video data from the camera. In another aspect, the controller is configured to change the flight path of the drone in response to analysis of the image or video data from the camera.

In another aspect, the system further includes a tether that connects the body to an external supply station. In another aspect, the material supply is disposed within the external supply station and the material is supplied to the rotary atomizer from the external supply station through the tether. In another aspect, the body includes a socket, and electrical power is provided to the socket from the external supply station through the tether. In another aspect, the external supply station includes an air supply configured to provide air to the rotary atomizer. The air is supplied to the rotary atomizer from the external supply station through the tether.

In another aspect, the drone further includes a torque offset mounted on the body and configured to balance the drone against torque generated by rotation of the rotating dispersion structure of the rotary atomizer. In another aspect, the torque offset is one of: (a) a rotor having a rotational axis oriented perpendicularly with respect to a rotational axis of the rotating dispersion structure of the rotary atomizer, or (b) one or more air jet thrusters configured to emit air in a same direction as rotation of the rotating dispersion structure of the rotary atomizer.

In another aspect, the material supply is a receptacle carried by the body. In another aspect, the receptacle is removably attached to the body.

In another aspect, the system further includes one or more position and/or orientation sensors supported by the body and operatively connected to the controller. In another aspect, the system further includes a memory configured to store a preprogrammed flight path of the drone executable by the controller. The one or more position and/or orientation sensors provide position data of the drone to the controller.

In another aspect, the system further includes a housing mounted to the body and receiving the rotary atomizer.

In another aspect, the system further includes an air supply supported by the body and connected to the rotary atomizer.

Another embodiment comprises a method of operating an assembly line. The method includes moving at least one motor vehicle body part to be painted along the assembly line, and painting at least one surface of the at least one motor vehicle body part while the at least one motor vehicle body part is located on the assembly line using one or more automated drone-based paint delivery systems. Each of the automated drone-based paint delivery systems includes a drone having: a body, at least one propeller rotatably supported by the body, at least one propeller motor supported by the body that selectively applies motive power to the at least one propeller, and a controller supported by the body and controlling a flight path of the drone at least by manipulating a speed of the at least one propeller. Each of the automated drone-based paint delivery systems further has one of a rotary atomizer or a powder applicator supported by the body for movement therewith and including a dispersion structure dispersing paint from a paint supply toward the at least one surface of the at least one motor vehicle body part.

In one aspect, each of the automated drone-based paint delivery systems includes a rotary atomizer and the dispersion structure is a rotating dispersion structure.

In another aspect, the paint is one of a waterborne paint, a solventborne paint, or a powder paint.

In another aspect, the at least one motor vehicle body part is at least one of a roof, hood, trunk lid, door, fender, panel, grill, or mirror housing.

BRIEF DESCRIPTION OF THE SEVERAL VIEWS OF THE DRAWINGS

The following detailed description of preferred embodiments will be better understood when read in conjunction with the appended drawings. For the purpose of illustration, there are shown in the drawings embodiments which are presently preferred. It should be understood, however, that the invention is not limited to the precise arrangements and instrumentalities shown.

In the drawings.

DETAILED DESCRIPTION

Certain terminology is used in the following description for convenience only and is not limiting. The words "right", "left", "lower", and "upper" designate directions in the drawings to which reference is made. The words "inwardly" and "outwardly" refer to directions toward and away from, respectively, the geometric center of the device and designated parts thereof. The terminology includes the above-listed words, derivatives thereof, and words of similar import, Additionally, the words "a" and "an", as used in the claims and in the corresponding portions of the specification, mean "at least one."

It should also be understood that the terms "about," "approximately," "generally," "substantially" and like terms, used herein when referring to a dimension or characteristic of a component, indicate that the described dimension/characteristic is not a strict boundary or parameter and does not exclude minor variations therefrom that are functionally similar. At a minimum, such references that include a numerical parameter would include variations that, using mathematical and industrial principles accepted in the art (e.g., rounding, measurement or other systematic errors, manufacturing tolerances, etc.), would not vary the least significant digit.

Figure 1:
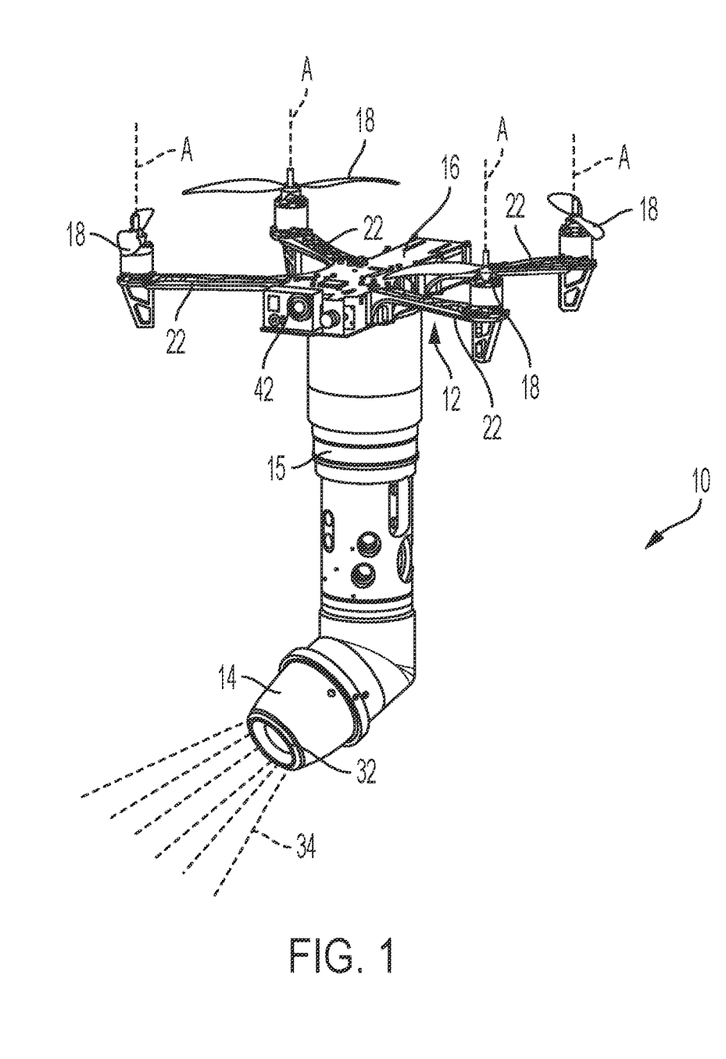
FIG. 1 is a front perspective view of an automated drone-based surface treatment material delivery system in accordance with an example embodiment of the present invention.
Figure 2:
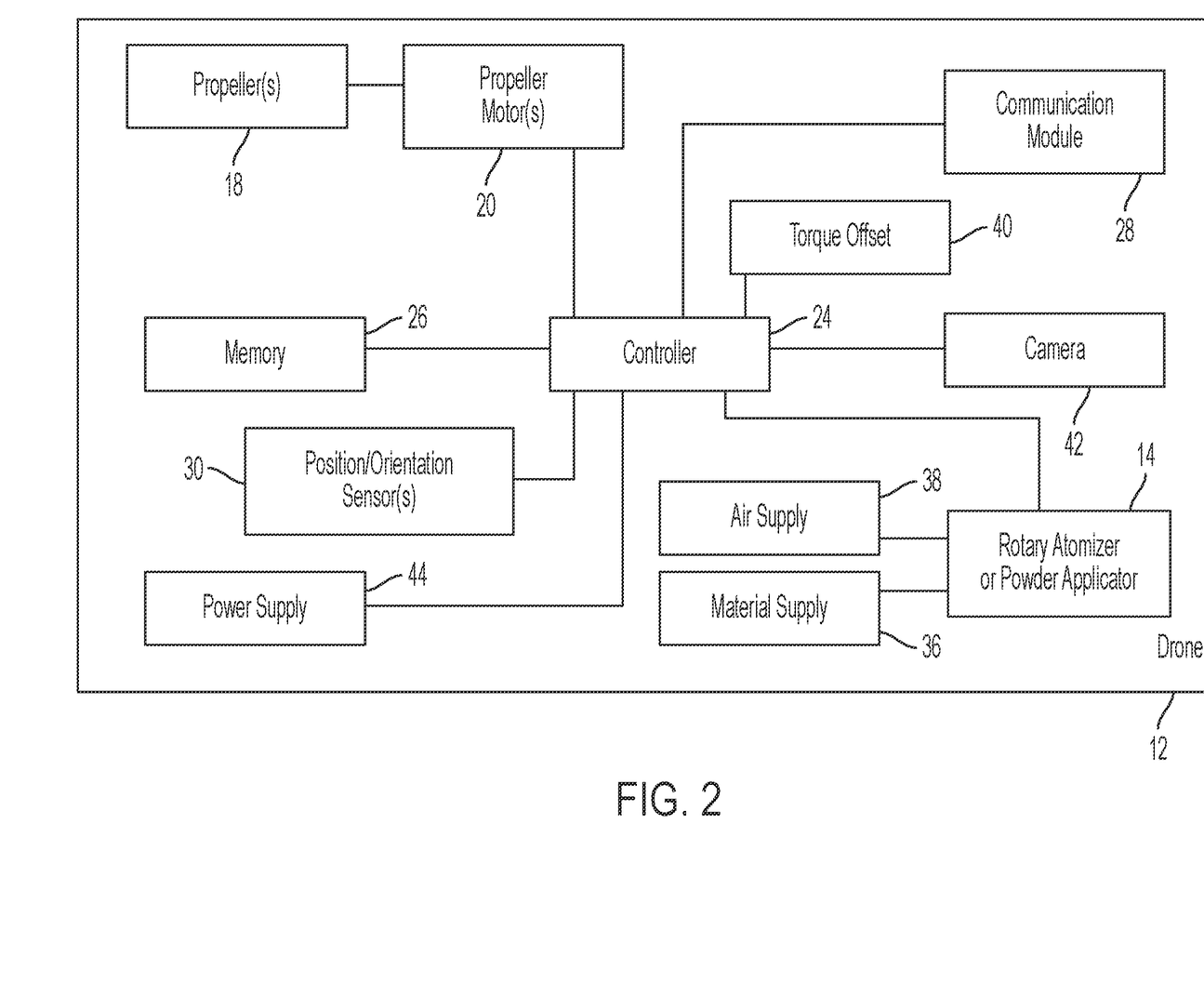
FIG. 2 is a schematic block diagram of the automated drone-based surface treatment material delivery system of FIG. 1.

Referring to FIGS. 1 and 2, there is shown an example of an automated drone-based surface treatment material delivery system 10 in accordance with an embodiment of the present invention. The system 10 preferably includes a drone 12 equipped with an industrial-type material applicator, for example a rotary atomizer 14, configured to apply a surface treatment material to one or more surfaces. The surface treatment material may be a waterborne or solventborne liquid, such as paint, varnish, oil, stain, or other like decorative and/or protective coating or finish, or any other type of liquid that is desired to be dispersed or applied to receiving surfaces, including e.g., water, pesticides, fire suppression chemicals, and the like. The surface treatment material may alternatively be in the form of a powder, as is known, for example, in the automotive industry. The system 10 is particularly useful for applying finishes to products or parts travelling along an automated assembly line, such as the assembly line 50 shown in FIG. 3, although the system 10 can be used with other types of fixed or moving surfaces as well, including building interiors or exteriors, landscapes, or the like.

The drone 12 is shown in FIG. 1 as a quadcopter, although other types of drones may be used as well with the system 10, such as, for example, a hexacopter. The drone 12 may include a body 16 supporting one or more propellers 18 configured to move the body 16 in various directions through three-dimensional space via selected variations in lift and thrust. For example, each propeller 18 may be rotatably mounted on a respective propeller arm 22 that extends at least partially radially outwardly from the main body 16. As shown in FIG. 1, the propeller arms 22 may be attached to the body 16 via screws, pins, snap-fitting, welding, adhesive, or the like. In other embodiments, the propeller arms 22 may be integrally formed with the body 16. In still other embodiments, the propeller(s) 18 may be rotatably coupled directly to the body 16.

Each propeller 18 preferably rotates about a rotational axis A. In some embodiments, the rotational axis A of one or more of the propellers 18 may be selectively variable. In other embodiments, thrust may be changed by varying rotational speeds of corresponding propellers 18 relative to one another. The body 16 of the drone 12 preferably also supports one or more propeller motors 20 for supplying motive power to the propellers 18. In some embodiments, each propeller 18 may be powered by its own independently controllable motor 20. In some other embodiments, a single propeller motor 20 can power all of the propellers 18 via controllable clutches (not shown). Any combination of propellers 18 and propeller motors 20 may be used for the drone 12 in keeping with aspects of the present invention.

The body 16 (and other structural components thereof, such as propeller arms 22) can have one of many different shapes and configurations and is preferably made from a lightweight polymer or a like material in order to reduce the amount of lift required to get the drone 12 off of the ground. The body 16 may further include one or more landing brackets (not shown) positioned and configured to allow the drone 12 to come to rest on the ground or another support surface without contacting the body 16 or other components described herein. The landing bracket(s) may be removably attached to the body 16 (e.g., by screws, pins, or the like), permanently attached to the body 16 (e.g., by welding, adhesive, or the like), or integrally formed with the body 16.

The drone 12 preferably includes an on-board controller 24 operatively connected to the propeller motor(s) 20 (and/or to components positioned between the propeller 18 and motor 20, such as the clutch mentioned above) and configured to control the flight path of the drone 12 by manipulating the speed(s) of the propeller(s) 18. The controller 24 is preferably composed of one or more microprocessors, but other types of controllers, such as application specific integrated circuits (ASIC), logic circuits, combinations of the preceding types, or the like may be used as well. The controller 24 may include or be operatively connected to an on-board memory 26, such as RAM, SRAM, DRAM, ROM, EPROM, EEPROM, flash memory, or the like for storing programming functions, maps, and other data.

The controller 24 is preferably also operatively connected to a communication module 28, which is preferably configured for wireless communication via one or more of WI-FI, BLUETOOTH, ZIGBEE, Z-WAVE, 3G, 4G, or 5G cellular, infrared, or other types of wireless protocols. In some embodiments, however, the communication module 28 may alternatively or additionally be configured for wired communication via serial (e.g., RS-485 or the like) communication, Ethernet, or the like. For example, the communication module 28 may provide an Ethernet port that can be coupled to a network when the drone 12 is at rest or placed in a docking station 62 (FIG. 4), or when using a tethered version (explained below) of the drone 12. Preferably, the communication module 28 allows the controller 24 to send operation data to, and/or receive programming instructions or other data from, off-board devices (see e.g., FIG. 4).

The controller 24 is preferably also connected to one or more position and/or orientation sensors 30 that can be mounted within and/or on the body 16 for allowing the controller 24 to determine, for example, two- or three-dimensional coordinates of the drone 12, operational status, or the like. Some example embodiments of the position and/or orientation sensors 30 include accelerometers, gyroscopes, global positioning system (UPS) receivers, radar, lidar, proximity detectors, optical sensors, and the like. For example, the memory 26 may store a preprogrammed flight path for the drone 12, which the controller 24 can follow using position data from one or more of the position and/or orientation sensors 30 and by manipulating the propeller 18 speeds.

The rotary atomizer 14 is preferably supported by the body 16 of the drone 12 for movement therewith. The rotary atomizer 14 may include a rotating bell cup 32 or similar rotating dispersion structure driven by a motor (not shown) to discharge the surface treatment material (e.g., paint) in a hollow conical spray 34. Rotary atomizers and atomization bell cups are well known in the art; examples of such devices are shown and described, for example, in U.S. Pat. Nos. 7,056,387; 8,851,397; 8,973,848; 9,375,734; 9,970,481; and 10,413,921, the entire contents of each of which are incorporated by reference herein. Rotary atomizers may be used to disperse liquid or powder-based surface treatment materials. However, in some embodiments, the rotary atomizer 14 may be substituted for by a powder applicator, as is known in, for example, automotive assembly lines. Such powder applicators may include a dispersion structure (not shown) for dispersing the powdered material toward the relevant surface. For simplicity, the example embodiments below utilize the rotary atomizer 14 to disperse the material, although with the understanding that a powder applicator may be substituted therefor under appropriate circumstances.

In FIG. 1, the rotary atomizer 14 is mounted to the body 16 via a housing 15 that extends in a vertically downward direction. The rotary atomizer 14 is oriented at an obtuse angle with respect to the vertical extension of the housing 15 such that the conical spray 34 travels in a partially horizontal direction. However, the rotary atomizer 14 may be oriented as needed with respect to the housing 15. For example, the rotary atomizer 14 may be aligned vertically with the housing 15 (see e.g., FIG. 3) to allow for a primarily vertical dispersion. In other embodiments, the rotary atomizer 14 may be oriented at a right angle or an acute angle with respect to the housing 15. In still other embodiments, the housing 15 itself may be oriented horizontally, vertically upward, or at an angle between horizontal or vertical with respect to the body 16, with the rotary atomizer 14 being oriented with respect to the housing 15 in any of the above-described positions, as necessary. In still other embodiments, the housing 15 may be omitted and the rotary atomizer 14 may be fixedly mounted directly to the body 16 at an appropriate orientation. It is further contemplated that the rotary atomizer 14 may be mounted to the housing 15 or the body 16 via a pivotable or rotatable connection (not shown) to allow the orientation of the rotary atomizer 14 with respect to the housing 15 and/or body 16 to change. Similarly, the housing 15 may be connected to the body 16 via a pivotable or rotatable connection (not shown) to perform like changes to the spray 34 direction. Under such circumstances, changes to the orientation may be achieved manually when the system 10 is out of operation or may be performed by the controller 24 either during periods of inactivity or during operation. Changes by the controller 24 may be made in response to user commands, preprogrammed patterns, or in response to data from the position/orientation sensors 30 or other feedback indicating a need for a change.

The rotary atomizer 14 may be connected with a material supply 36 which provides the surface treatment material dispersed by the rotary atomizer 14. In one embodiment, the material supply 36 may be a supply can or similar receptacle carried by the body 16 of the drone 12. The material supply can 36 may be removably attached to the body 16, such as by a threaded or snap-on connection, by clamps or other types of mechanical fasteners, or the like. Preferably, the coupling allows for quick and automated connection and disconnection such that the drone 12 can discard and pick up a new material supply can 36 on its own during operation, such as from a docking station 62 or supply station 64 (FIG. 4) or the like. In other embodiments, the material supply 36 may be a receptacle that is permanently attached to or contained within the body 16 (such as an internal chamber), and may be refillable, for example, via a valved port (not shown) or the like. A material teed tube (not shown) may be provided with one end submerged within the material supply 36 so as to transport the surface treatment material to the rotary atomizer 14. Any equipment (e.g., a pump, vacuum, or the like, not shown) deemed necessary for drawing the surface treatment material into the material feed tube is preferably disposed within the body 16 or other connected components, such as the housing 15, for example. In tethered embodiments (discussed below), the material supply 36 may be off-board of the drone 12 and the surface treatment material may be fed through a line in the tether 60 (FIG. 4) to the rotary atomizer 14.

In some operations, the surface treatment material dispersed by the rotary atomizer 14 may be periodically changed. For example, when the rotary atomizer 14 is used for painting, it may be necessary to change the color of the paint. To prevent cross-contamination in such circumstances, the bell cup 32, the rotary atomizer 14, and/or other equipment related to the material supply 36 may be cleaned. In embodiments where the drone 12 is able to exchange material supply cans 36, the drone 12 may temporarily connect a can (not shown) containing solvent or compressed air that can be used to flush the various components exposed to the previous surface treatment material during normal operation. Other options include connecting the material supply 36 or other equipment related to the atomization to a source of compressed air and/or solvent (not shown). In tethered embodiments (discussed below), the cleaning operation can be initiated off-board and solvent and/or compressed air can be supplied through a line in the tether 60 (FIG. 4) through to the rotary atomizer 14.

The rotary atomizer 14 may be further connected with one or more air supplies 38, wherein the rotary atomizer 14 may use the supplied air to shape the spray 34 and/or operate one or more internal components of the rotary atomizer 14 (e.g., valves, bearings, turbines or the like). In some embodiments, the air supply 38 may include an on-board compressor (not shown) carried by the drone 12 to draw in and pressurize ambient air. In other embodiments, the body 16 may include a gas chamber or be connected to a gas canister (not shown) or similar receptacle containing pressurized gas. Similar to the material supply 36 above, such embodiments would require periodic replacement or refilling of the air supply 38. In tethered embodiments (discussed below), the air supply

38 may be off-board of the drone 12 and fed through a line in the tether 60 (FIG. 4) to the rotary atomizer 14.

The rotary atomizer 14 may further be configured for electrostatic operation, wherein a high voltage (e.g., up to about 100 kiloVolts or the like) is applied to various metallic components of the rotary atomizer 14, which can include the bell cup 32. Such high voltage may be supplied directly from a power supply 44 (described in further detail below) or may be generated by internal circuitry (not shown) of the rotary atomizer 14 that amplifies a received lower voltage signal.

Rotary atomizers are operated at speeds of preferably about tens of thousands of RPMs or greater in order to provide proper droplet sizes and flow rates of the surface treatment material being dispersed. Based on these requirements, it is expected that operation of the rotary atomizer 14 may exert a significant torque on the body 16 of the drone 12 so as to disrupt the balance and flight path of the drone 12. Accordingly, in some embodiments it may be appropriate to supply the system 10 with a torque offset 40 to counter torque generated by the rotary atomizer 14 and balance the drone 12 when the rotary atomizer 14 is in operation. The torque offset 40 may be operatively connected to the controller 24 such that the torque offset 40 is active only during rotary atomizer 14 operation and may appropriately compensate for ramp-up or ramp-down speeds of the rotary atomizer 14.

As one example, the torque offset 40 may include an additional rotor (not shown) that is mounted on the body 16 (for example, either directly on the body 16 or via an attached arm or the like) and has a rotational axis that is oriented perpendicularly with respect to a rotational axis of the bell cup 32 of the rotary atomizer 14. The principle of operation is much like that of a helicopter. The torque offset 40 in the form of the additional rotor may be rotated at speeds the controller 24 may vary depending on the current rotary atomizer 14 speed and orientation, volume of surface treatment material present in the material supply 36, the speed of the propeller(s) 18, and other like conditions which could affect the balance of the drone 12. The controller 24 may use data from one or more of the position/orientation sensors 30, data from the memory 26 (e.g., flight plan information or the like), known propeller speed, or the like to adjust the torque offset 40 variables accordingly. To the extent that the orientation of the rotational axis for the bell cup 32 of the rotary atomizer 14 may be changed, the torque offset 40 preferably would also include a pivotable or rotatable connection (not shown) to the body 16 to allow compensatory changes to the torque offset 40 rotational axis. Such adjustments are preferably made by the controller 24, although manual adjustments could be made as well. Where manual adjustments are available for the rotary atomizer 14, a linkage (not shown) could connect the rotary atomizer 14 and the additional rotor 40 such that changes to the rotary atomizer 14 position may be automatically translated to the additional rotor 40, preventing manual error in alignment.

In another example, the torque offset 40 may include one or more air jet thrusters (not shown) mounted on the body 16 and configured to emit compressed air in the same direction as rotation of the bell cup 32 of the rotary atomizer 14 and in an amount to supply a thrust sufficient to counter the reactional torque from the rotation of the bell cup 32 of the rotary atomizer 14 on the body 16. Air for the thrusters may be derived from the air supply 38 for the rotary atomizer 14, or from a separate supply line or compressor apparatus (not shown). Similar to the above-described torque rotor example, the torque offset 40 in the form of the air jet thrusters may allow output adjustments to account for parameters affecting the drone 12 balance, as well as directional adjustment of each thruster to account for orientation changes of the rotary atomizer 14. Such adjustments are preferably made by the controller 24, although manual adjustments could be made as well.

In yet another example, the torque offset 40 may be provided by angling or controlling of the propellers 18 in such a manner as to counteract the torque effects of the rotation of the bell cup 32 of the rotary atomizer 14. For example, the propellers 18 may be positioned on pivotable or rotatable mounts (not shown) supported by the body 16 such that when the rotary atomizer 14 is operating, the controller 24 can angle the propellers 18 in a direction to balance out the torque. Depending on the angle of the rotary axis of the rotary atomizer 14 and other configurations, the same may be accomplished through speed control by the motor of the propellers 18.

The system 10 may further include one or more cameras 42 which may be mounted on or in, or attached to, the body 16, and which may be operatively connected to the controller 24. The one or more cameras 42 may be configured to capture images and/or video in at least one of visible, infrared, or ultraviolet wavelengths. The one or more cameras 42 may be utilized to, for example, monitor flight paths, monitor equipment status and/or functionality, inspect targets, detect obstacles, or the like. Each camera 42 may have its own designated function, or multiple cameras 42 may cooperate for the same purpose.

The controller 24 may receive data from the one or more cameras 42 for analysis, conversion, storage, and/or reporting. For example, the controller 24 may include software or other programming enabling object identification or other types of image analysis. With the resulting analysis data, the controller 24 may preferably be able to control other aspects of the system 10 in response, such as by changing flight paths, turning the rotary atomizer 14 on or off, or the like. As one particular example, when an embodiment of the system 10 is used for painting, one or more cameras 42 can be used to help identify areas on the target requiring paint, and/or may be used to identify defects on the target that require re-application or other types of correction. The controller 24 can then, upon analyzing captured images, update the drone 12 flight path and engage the rotary atomizer 14 to apply paint to the affected area. Images and/or video may also be stored in the memory 26 and/or sent to external devices via the communication module 28 for further evaluation. As one example, when a camera 42 in the above-described painting embodiment detects a defect in the surface, the controller 24 may report the defect externally to the manufacturing line. This may temporarily cause a stoppage in the line to allow the defect to be corrected by the system 10 before moving on.

The system 10 may further include a power supply 44 for providing electrical power to one or more of the components of the system 10, including, for example, the controller 24, rotary atomizer 14, propeller motor(s) 20, memory 26, communication module 28, position/orientation sensor(s) 30, torque offset 40, and/or camera(s) 42. In some embodiments, power from the power supply 44 may be distributed by the controller 24 as needed to the various components of the system 10. In some other embodiments, various components of the system 10 may be connected directly to the power supply 44 with the controller 24 configured to operatively manipulate switches (not shown) to selectively turn the various components on or off. In still other embodiments, individual components of the system 10 may include their own self-contained power supplies (not shown), Combinations of the foregoing are possible as well.

The power supply 44 is preferably one or more on-board rechargeable batteries, such as a lithium polymer (LiPo) battery, a lithium polymer high voltage (LiHV) battery, or the like, which may be carried on and/or within the body 16 of the drone 12. The power supply 44 or the body 16 may include one or more electrical contacts (not shown) to allow charging of the power supply 44 when connected to an external charger (not shown). For example, the drone 12 may land in a docking station 62 (FIG. 4) with re-charging capabilities when not in use, the drone 12 may have a charging port (not shown) for connection to a stand-alone charger (not shown), the power supply 44 could be removed from the body 16 to allow for re-charging, or the like. In some embodiments, the body 16 may include a quick-release catch for the power supply 44 such that the power supply 44 may be easily automatically attached or detached while the drone 12, for example, is seated in the docking station 62. In some embodiments, the body 16 may include two redundant ports (not shown) so that a fresh battery 44 may be attached to the drone 12 prior to dropping a depleted battery 44 at the docking station 62.

In tethered versions, the power supply 44 may be a socket or the like (not shown) configured to receive a power cable (not shown) fed through the tether 60 (FIG. 4), wherein the power cable carries a mains voltage or some other conditioned electrical signal to be used in powering various components of the system 10. In some embodiments, the system 10 may provide the option to selectively utilize either a battery or a socket as the power supply 44 depending on the operating conditions, power source availability, and the like. In still other embodiments, the power supply 44 may include both the battery and the socket for powering respectively different components of the system 10 during operation. For example, the battery may power the propeller motor 20, controller 24, memory 26, communication module 28, position/orientation sensors 30, torque offset 40, and/or camera 42, while the socket may receive a high voltage cable for enabling electrostatic operation of the rotary atomizer 14. Other combinations and options may be utilized as well in keeping within the spirit and scope of the invention.

Figure 3:
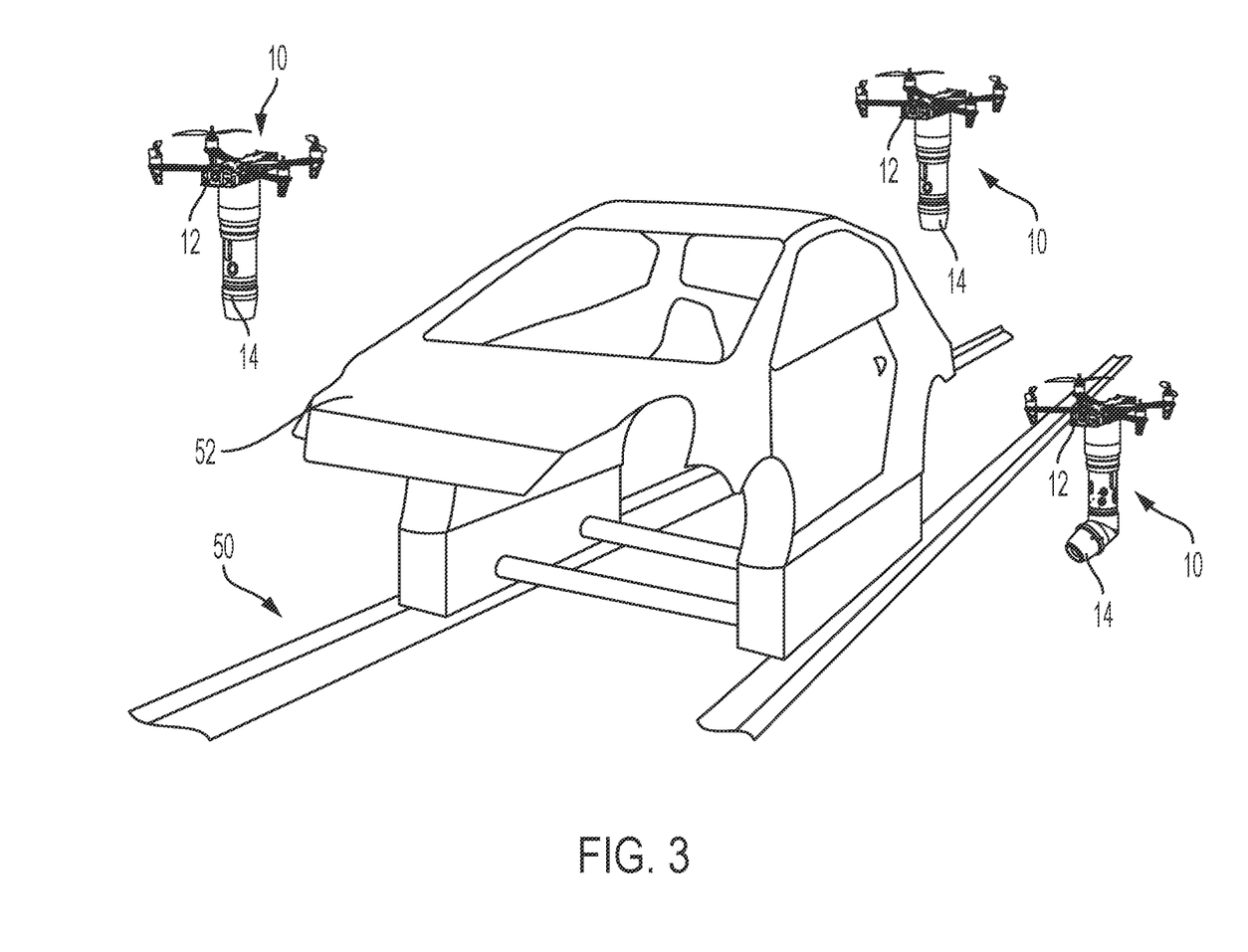
FIG. 3 is a front perspective view of a portion of an assembly line utilizing a plurality of the drone-based surface treatment material delivery systems of FIG. 1 to paint an object.

Referring to FIG. 3, a portion of an example assembly line 50 is shown moving an object 52 to be painted, such as at least one motor vehicle body part. The at least one motor vehicle body part may be, for example, at least one of a roof, hood, trunk lid, door, fender, panel, grill, mirror housing, or the like. In the example shown in FIG. 3, several body parts (e.g., roof, hood, doors, etc.) have been previously assembled together into a body assembly 52 for painting. However, motor vehicle body parts may be painted individually, either before or after assembly with other portions of the motor vehicle, as desired.

In this example, a plurality of drone-based surface treatment material (in this case, paint) delivery systems 10 are utilized to paint the body assembly 52. Each drone 12 may work in concert with the others to paint the entirety of the body assembly 52, similar to how multiple robot arms are used in conventional assembly lines. Each of the drones 12 may fly along a preprogrammed path to paint a different section of the body assembly 52, which can be done with the assembly line 50 in motion or stopped periodically. In the particular example of FIG. 3, two of the drone-based paint delivery systems 10 have their respective rotary atomizers 14 configured in a vertically downward facing orientation, which is useful for applying paint to generally horizontally-lying surfaces of the body assembly 52, such as the roof, hood, trunk, and the like. A third one of the drone-based paint delivery systems 10 has its rotary atomizer 14 oriented as shown in FIG. 1. This allows the third drone 12 to apply paint to generally vertically oriented surfaces of the body assembly 52, such as the car doors, fenders, and the like, while flying lower to avoid flight path conflicts with the other drones 12. Of course, the arrangement shown in FIG. 3 is exemplary only, and any number of drone-based paint delivery systems 10 may be utilized with rotary atomizers 14 oriented at angles that permit the desired painting result on the object 52. Moreover, one or more of the drone-based paint delivery systems 10 may substitute its rotary atomizer 14 for a powder applicator, if applicable.

Figure 4:
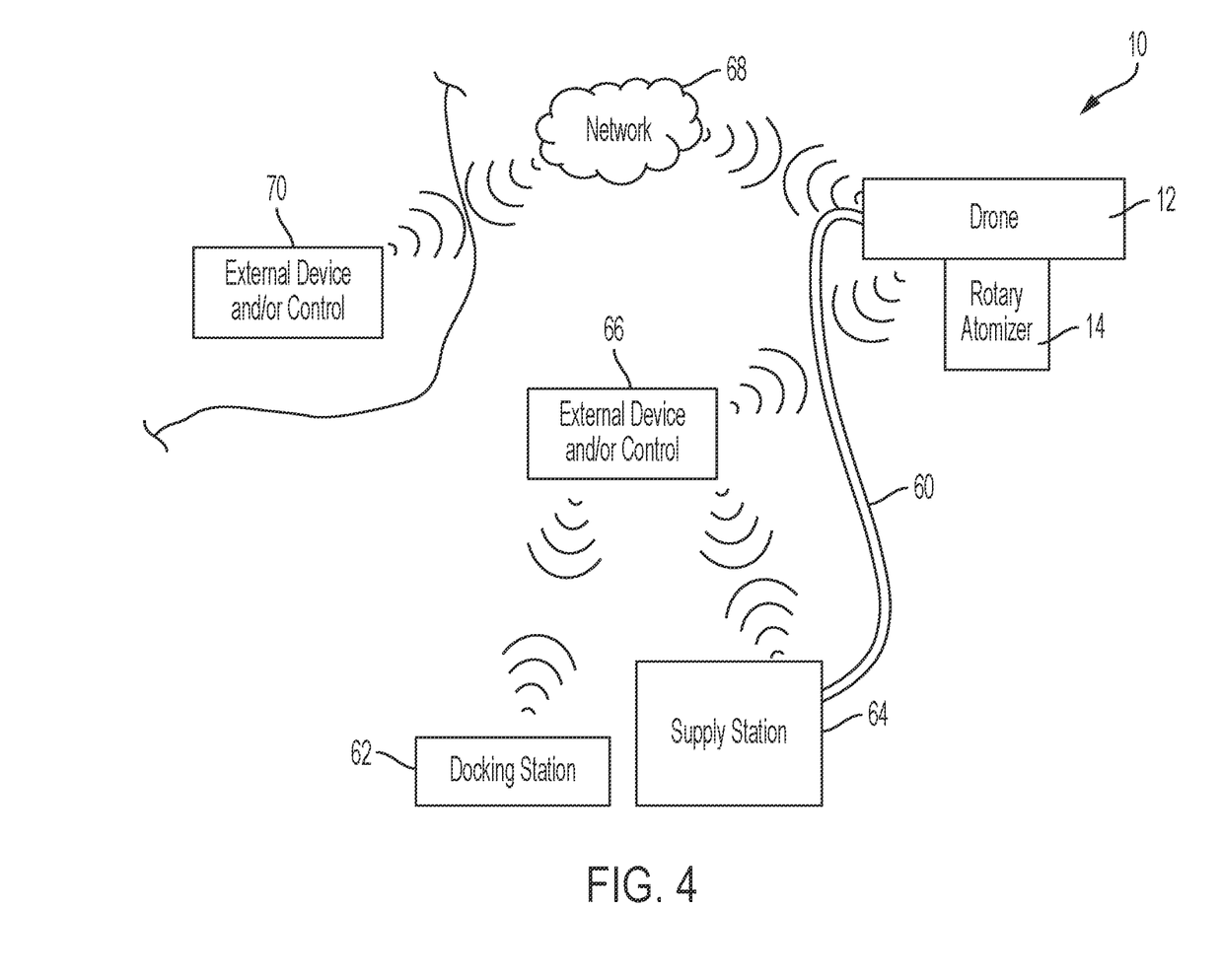
FIG. 4 is a schematic block diagram of potential communication channels for use with the drone-based surface treatment material delivery system of FIG. 1.

FIG. 4 shows an example of a tethered version of the system 10, wherein the drone 12 is connected by a tether 60 to a supply station 64. The supply station 64 may be a permanent or mobile installation capable of supplying one or more of surface treatment material, air, power, or the like to the drone 12 as explained above. For example, the supply station 64 may include one or more containers (not shown) of surface treatment material that can be provided to the rotary atomizer 14 via a supply line (not shown) within the tether 60. As explained above, the tether 60 may further include a data cable (not shown) to allow communication between the drone 12 and the supply station 64. The tether 60 should have a length which allows the drone 12 to proceed upon its expected flight plan without disruption from the tether 60. For example, the tether 60 may include several feet of slack when the drone 12 reaches its farthest expected travel point from the supply station 64.

As explained above, a docking station 62 may be provided and have re-charging capabilities when the drone 12 is docked. The docking station 62 therefore should have a geometry suitable to receive the drone 12 in a configuration which allows easy access to any power ports or for dropping and receiving batteries. The docking station 62 may contain a lock (not shown) to keep the drone 12 in the docking station 62 until use is authorized. The lock may be electronically operated, such as by a touchpad, keypad, or the like, or may be accessed via an external device 66, for example. It is further useful if docking by the drone 12 automatically engages the lock. In other embodiments, the lock may be a manual lock that must be physically opened and closed by an operator, for example, by a key, a rotary lock, or the like.

While shown in FIG. 4 as being separate from a docking station 62, the supply station 64 may be connected with or form part of the docking station 62 and vice versa.

FIG. 4 also shows some examples of potential communication paths between the system 10 and other devices. While portrayed in FIG. 4 in relation to a tethered embodiment, it is understood by those skilled in the art that the communication paths shown in FIG. 4 may be used with an untethered drone 12 as well.

For example, the drone 12 may communicate, via the on-board communication module 28, with an external device 66, which can range from a simple remote control device to a sophisticated computer. In the example of FIG. 4, the drone 12 is shown communicating directly and wirelessly with the external device 66, over which connection the external device 66 may send control commands (e.g., flight path implementation/changes, turning various system components (e.g., the rotary atomizer 14 or the like) on or off, and the like) to the drone 12. In addition, the drone 12 may send data, such as information from the position/orientation sensors 30, level information for the material supply 36, air supply 38, power supply 44, or the like, images from the camera 42, error information, and the like back to the external device 66 for further analysis.

In some embodiments, it is contemplated that the external device 66 functionality may be incorporated as part of the docking station 62 and/or the supply station 64. In tethered versions of such embodiments, the communication with the drone 12 may be facilitated through a communication line (not shown) in the tether 60, although wireless communication can be used in tethered versions as well, Where the external device 66 is separate from the docking station 62 and/or the supply station 64, the external device 66 may be configured to communicate not only with the drone 12, but also with the docking station 62 and/or the supply station 64. For example, the external device 66 may send a command to the supply station 64 to change to a different surface treatment material, initiate a cleaning, or the like. Data may also be shared with the external device 66 from the docking station 62 and/or the supply station 64. For example, the supply station 64 may report material level from the material supply 36, or the like. In some embodiments, the external device 66 may communicate wirelessly with the drone 12 but may have a wired connection (not shown) to the docking station 62 and/or the supply station 64.

The external device 66 may further facilitate communication between the drone 12 and the docking station 62 and/or the supply station 64. For example, the drone 12 may send data or control commands to the supply station 64 using the external device 66 as an intermediary. In other embodiments, however, the drone 12 may communicate directly (not shown) with the docking station 62 and/or the supply station 64.

Communication may also be established over a more conventional network 68, such as a local area network (LAN), wide-area network (WAN), the Internet, or the like, which can allow the drone 12 to communicate with a remote external device 70, i.e., a device which may not be physically present in the same space as the drone 12. The remote external device 70 may be similar to the external device 66 described above, e.g., the remote external device 70 may issue control commands to the drone 12 and/or receive data from the drone 12 for further analysis. In some embodiments, the drone 12 may communicate with both the external device 66 and the remote external device 70. As with the external device 66, although not shown in FIG. 4, the remote external device 70 may also communicate with the docking station 62 and/or the supply station 64 over the network 68. It is further possible that the remote external device 70 may communicate with one component over the network 68 and use that component to communicate with others locally. For example, in FIG. 4, the remote external device 70 communicates with the drone 12 over the network 68, and may utilize the drone 12 to send control commands to, or receive data from, the docking station 62 and/or the supply station 64. It is further contemplated that when both an external device 66 and a remote external device 70 are used, the two components may communicate with one another over the network 68.

Although not shown in FIG. 4, it is also envisioned that even various components within close proximity may communicate with one another via the network 68 rather than directly. For example, the drone 12 may interact with one or any of the external device 66, the docking station 62, or the supply station 64 via the network 68. It is further envisioned that the network 68 may comprise multiple networks, which may be provided for redundancy and/or to facilitate different functionality. For example, a local network may be employed to allow the drone 12 to communicate with the external device 66, the docking station 62, and/or the supply station 64, while a wider network may be simultaneously deployed to allow communication with a remote external device 70 by one or more of the components.

While specific and distinct embodiments have been shown in the drawings, various individual elements or combinations of elements from the different embodiments may be combined with one another while in keeping with the spirit and scope of the invention. Thus, an individual feature described herein only with respect to one embodiment should not be construed as being incompatible with other embodiments described herein or otherwise encompassed by the invention.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

We claim:

1. An automated drone-based surface treatment material delivery system comprising:

a drone comprising:

a body, one or more propellers rotatably supported by the body and configured to provide thrust for lifting and moving the body in space, at least one propeller motor supported by the body and configured to selectively apply motive power to the one or more propellers, and a controller supported by the body and configured to control a flight path of the drone at least by manipulating a speed of at least one of the one or more propellers;

a housing extending generally vertically away from a bottom surface of the body; and a rotary atomizer comprising:

a refillable material supply supported by the body, a rotating dispersion structure provided at an end of the housing opposite to the body of the drone and configured to disperse a surface treatment material from the material supply, a supply line providing fluid communication between the refillable supply and the rotating dispersion structure, a rotating drive shaft, the rotating dispersion structure being attached to an end of the drive shaft for rotation therewith, the rotating dispersion structure and the rotating drive shaft being oriented at an angle between about 90°-180° with respect to the housing, an air-driven turbine mounted on the drive shaft and configured to rotate the drive shaft, and a valved filling port in selective fluid communication with the refillable material supply.

2. The system of claim 1, wherein the material supply is a chamber disposed in the body.

3. The system of claim 1, further comprising an air supply supported by the body and connected to the rotary atomizer.

4. The system of claim 1, further comprising a camera disposed on or in the body and operatively connected to the controller.

5. The system of claim 4, wherein the controller is configured to receive and analyze image or video data from the camera.

6. The system of claim 5, wherein the controller is configured to change the flight path of the drone in response to analysis of the image or video data from the camera.

7. The system of claim 1, further comprising a tether that connects the body to an external supply station.

8. The system of claim 7, wherein the body includes a socket, and electrical power is provided to the socket from the external supply station through the tether.

9. The system of claim 7, wherein the external supply station includes an air supply configured to provide air to the rotary atomizer, the air being supplied to the rotary atomizer from the external supply station through the tether.

10. The system of claim 1, wherein the drone further comprises a torque offset mounted on the body and configured to balance the drone against torque generated by rotation of the rotating dispersion structure of the rotary atomizer, the torque offset being different from the one or more propellers.

11. The system of claim 10, wherein the torque offset is one of:

(a) a rotor having a rotational axis oriented perpendicularly with respect to a rotational axis of the rotating dispersion structure of the rotary atomizer, or (b) one or more air jet thrusters configured to emit air in a same direction as rotation of the rotating dispersion structure of the rotary atomizer.

12. The system of claim 1, further comprising one or more position and/or orientation sensors supported by the body and operatively connected to the controller.

13. The system of claim 12, further comprising a memory configured to store a preprogrammed flight path of the drone executable by the controller, and wherein the one or more position and/or orientation sensors provide position data.

* * * * *